No. 630,165. Patented Aug. 1, 1899.
A. BARBAY.
APPARATUS FOR TRANSFERRING SUGAR CANE.
(Application filed Dec. 1, 1898.)
(No Model.) 2 Sheets—Sheet 1.
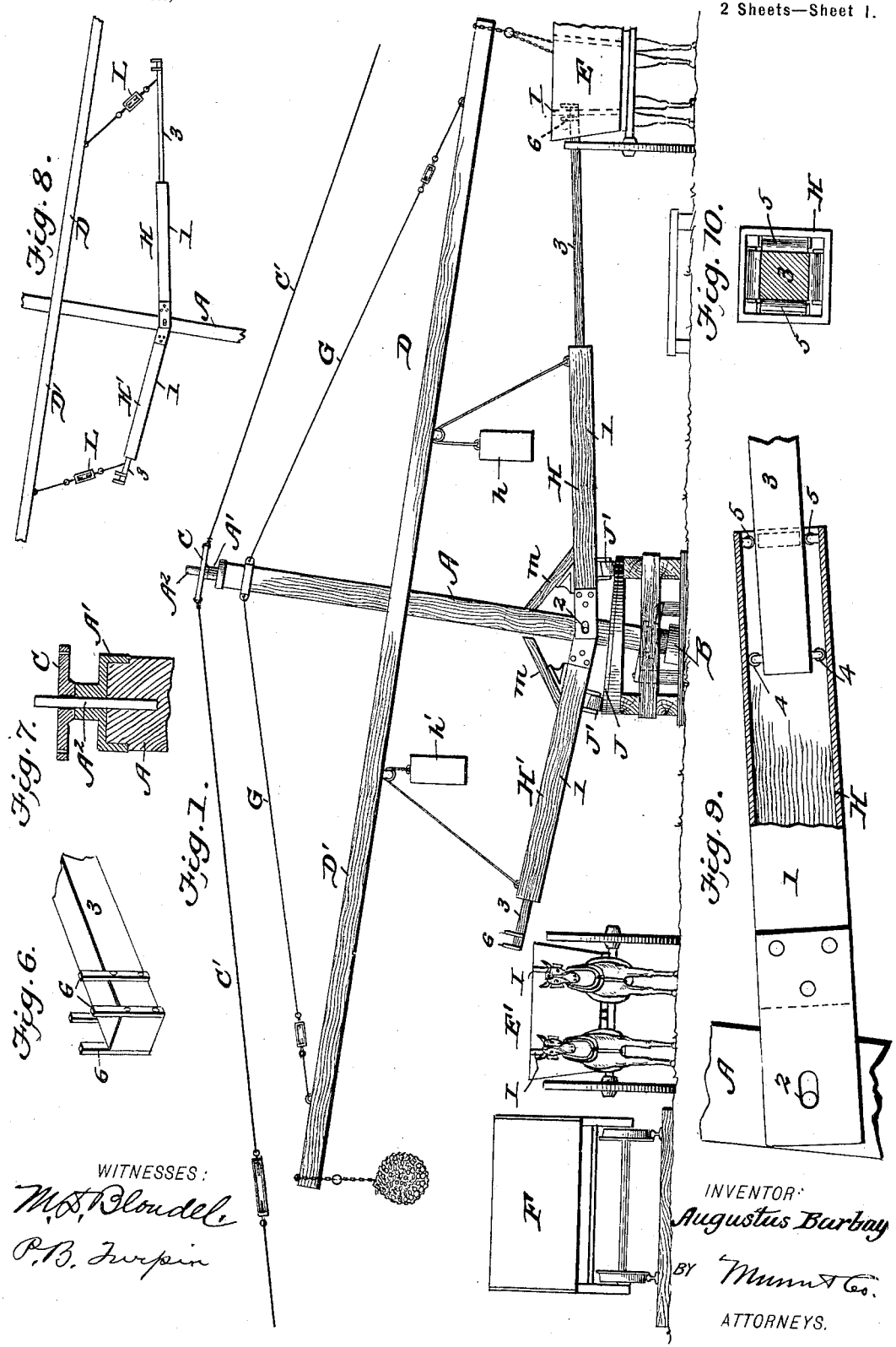
WITNESSES:
M. A. Bloudel
P. B. Turpin
INVENTOR:
Augustus Barbay
BY Munn & Co.
ATTORNEYS.

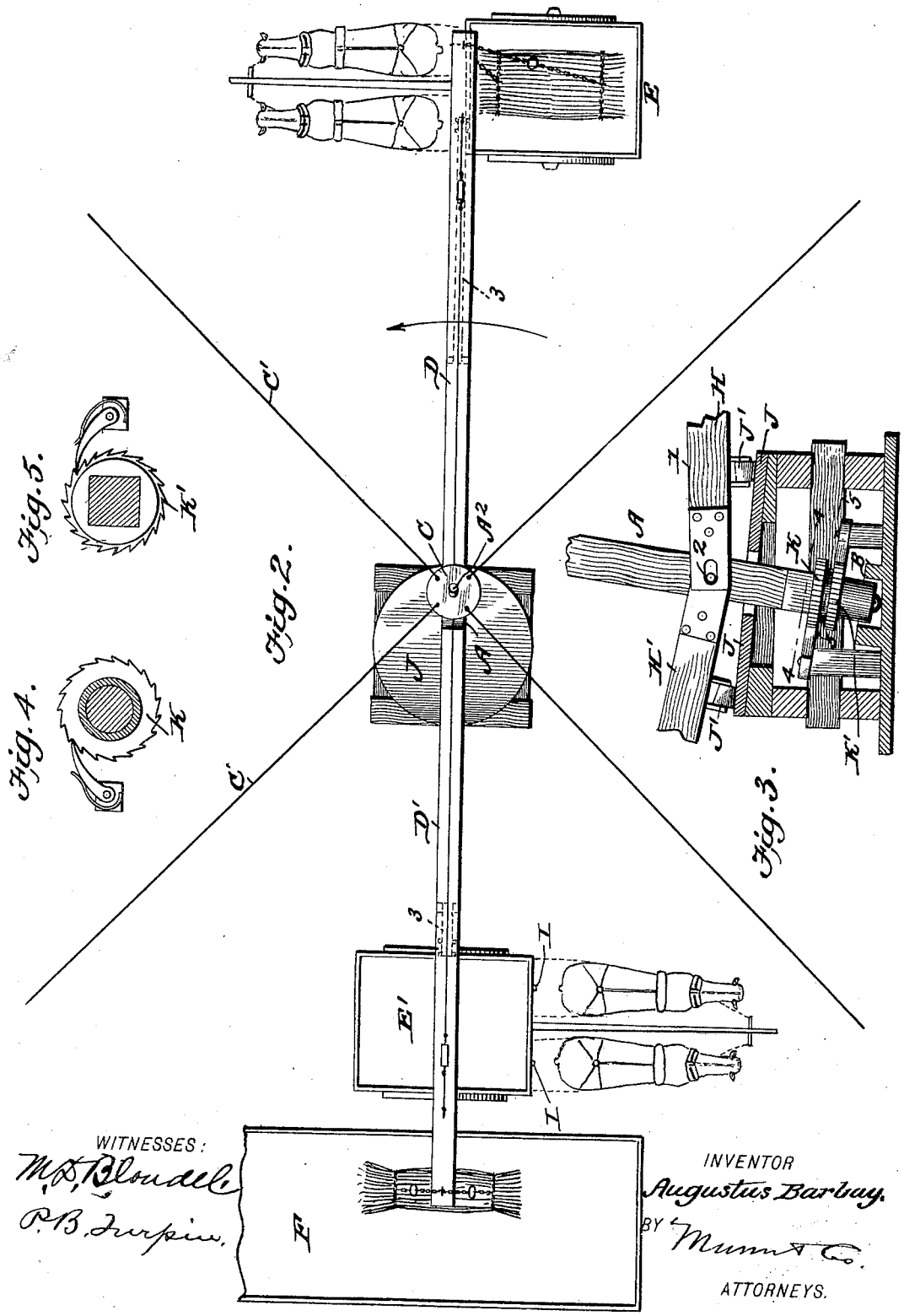

UNITED STATES PATENT OFFICE.

AUGUSTUS BARBAY, OF PLAQUEMINE, LOUISIANA.

APPARATUS FOR TRANSFERRING SUGAR-CANE.

SPECIFICATION forming part of Letters Patent No. 630,165, dated August 1, 1899.

Application filed December 1, 1898. Serial No. 698,026. (No model.)

*To all whom it may concern:*

Be it known that I, AUGUSTUS BARBAY, residing at Plaquemine, Iberville parish, in the State of Louisiana, have invented a new and useful Improvement in Apparatus for Transferring Sugar-Cane, of which the following is a specification.

My invention is an apparatus for use in transferring sugar-cane, being especially designed for use in taking cane as it is brought from the field and placing it in cars or other receptacles; and the invention consists in certain novel constructions and combinations of parts, as will be hereinafter described, and pointed out in the claims.

In the drawings, Figure 1 is a vertical elevation of an apparatus embodying my invention. Fig. 2 is a top plan view thereof. Fig. 3 is a vertical section of the base of the apparatus. Figs. 4 and 5 are cross-sections on respectively lines 4 4 and 5 5 of Fig. 3. Fig. 6 is a detail perspective view of the outer section of the lever-arm. Fig. 7 is a detail sectional view illustrating the upper bearing of the shaft. Fig. 8 shows a somewhat different construction for supporting or counterbalancing the lever-arms. Fig. 9 is a detail view, partly in longitudinal section, of the lever-arm; and Fig. 10 is a detail cross-sectional view of the lever-arm on about the line 10 10 of Fig. 9.

By my invention I provide means whereby a cart from the field loaded with cane may be driven beneath a sweep, to which the cane in the cart may be secured by any desired form of sling, and the cart may then be moved in a line approximating a circle to adjust said sweep to position to discharge the said cane into a car or other receptacle.

The apparatus, as shown, includes a shaft A, journaled at its lower end in a step-bearing B and at its upper end in a suitable bearing, which may be a plate C, held by guys C', as shown in Figs. 1 and 2. This shaft A is set at an angle inclined to the vertical, so its sweeps D D' will in one position dip down toward the ground and will in a diametrically opposite position be elevated to a considerable height, as will be understood from Fig. 1. This permits the cane to be taken from the cart at a certain height and delivered at a much greater height without necessitating the use of any independent hoisting means, as will be readily understood from Fig. 1. In the construction shown the shaft A is capped by a metallic plate A', and the short journal $A^2$ fits in the upper end of the shaft and in the cap-plate A' and projects above the latter to fit in the plate C, before described. In the operation of the described construction the cane in the cart E is connected with the outer end of the sweep D, which is lowered nearly to the cart, so there is no difficulty in connecting the cane with said sweep D by the use of any desired form of cane-slinging apparatus. Then if the shaft A be given a half-revolution the sweep D will be brought to the position occupied in Fig. 1 by the sweep D', and the cane on said sweep D will be adjusted over the car F, into which it may be delivered in any desired manner, as will be readily understood. The sweeps D and D' may be braced by means of the guys G G, as shown, or by struts or other suitable means, as may be desired.

In turning the shaft A it is preferred to employ the cart from which the cane is being discharged, as in so doing I utilize a power which is right at hand and lift the cane from the cart by the same power that adjusts the sweep to the position in which it discharges the cane into the car. In carrying out this feature of my invention I provide lever-arms H and H', corresponding to the sweeps D and D' and arranged beneath their respective sweeps. These arms are adapted at their outer ends to be pressed against by the front of the cart, so the cart as it is driven from the position shown at E, Fig. 1, to that shown at E' in said figure will swing the shaft A a half-revolution, as desired. The lever arms are each composed of an inner section 1, which is pivoted at 2 to the shaft A, and an outer section 3, which slides at its inner end along the section 1, so the lever-arm may be lengthened or shortened. In the construction as preferred the section 1 is hollow and the section 3 slides within the open outer end of the section 1, rollers 4 4 and 5 5 being provided to reduce friction. The cart has upon it a vertical cleat I, and the section 3 is provided with lugs or projections 6, which lie on opposite sides of the cleat I, as will be understood from Fig. 1. In moving the cart from the position E to the position E', Fig. 1, the cart is not driven in a circle, but in a spiral line gradually approaching the shaft A, as will be understood from Fig. 1, in which it will be seen that the cart E' is much nearer the shaft A than the cart E. From this it will be seen that the cart gradually moves the section 3 into the section 1 until the lever-arm escapes from engagement with the cart E, and the apparatus stops with the sweep directly over the car F in position to discharge the cane thereinto. This releasing of the lever-arm from the cart may be effected by means of counterbalancing-weights $h$ and $h'$, connected with the arms H H', and so related to said arms as to elevate them when the outer extension 3 has been pushed into the inner section, as shown at the left in Fig. 1, and to be overbalanced by the lever-arm when its section 3 is adjusted outward, as shown at the right in Fig. 1, or the lever-arms may be raised and lowered by means of a cam-rail J, upon which rollers J' on said arms bear, as will be understood from Fig. 1, or, if desired, the cam-rail and the counterbalancing-weights may both be employed.

It is preferred to pivot the lever-arms at 2 to the shaft A, because thereby the relation of said arms to the cane-carrying sweeps may be changed, and also because such pivoting of the lever-arms enables me to vary the point at which the said arms may be released from engagement with the cart.

It is desired sometimes to operate the apparatus by a cart coming from one direction and at other times by one coming from the opposite direction, and it is also desirable to prevent any back-turning of the shaft. To this end I provide detent mechanism consisting of ratchet-wheels K and K' on the shaft A, such wheels having their teeth facing in opposite directions and engaged by pawls. One ratchet-wheel is used when the shaft is turned in one direction and the other when the shaft is turned in the opposite direction, the pawl of the other wheel being in each instance thrown out of engagement with the wheel with which it operates.

In Fig. 8 I show a somewhat different construction for operating the outer section 3 of the lever-arms and consisting of hanger-rods connecting such section with the sweep and provided with turnbuckles L, so they may be adjusted as desired. In this construction when the cart is freed from engagement with the section 3 the latter swings inward from the position shown at the right in Fig. 8 to that shown at the left in said figure.

In the operation of my invention a cart loaded with cane may be driven to the position shown at E, Fig. 1, and the section 3 of the lever-arm be drawn outward and engaged with the cleat I of the cart E, the cane in said cart being suitably connected with the outer end of the sweep D. If now the cart be driven in a spiral path from the position shown at E to the position shown at E', it will have turned the shaft A to elevate such cane to a point above the car and will also have automatically adjusted the outer section 3 of the lever-arm inward, so the lever-arm may be raised clear of the cart and the sweep will be in position to deliver the cane into the car. This half-revolution not only adjusts one sweep from loading to unloading position, but it also adjusts the other sweep from unloading to loading position, the operation being practically continuous, one sweep being in position to receive cane from a cart while the other sweep is in position to deliver cane to the car.

It is manifest that my apparatus is simple in construction, can be readily erected at any point where it is desired to use the same, and dispenses with all unnecessary power by providing means whereby the horse or mule hitched to the cart to be unloaded operates the transferring apparatus.

Bars $m$ are secured at one end to the arms H H' and are arranged at their other ends to engage the shaft A to limit the upward movement of the arms.

Having thus described my invention, what I claim, and desire to secure by Letters Patent, is—

1. In an apparatus substantially as described, the combination of the shaft inclined to the vertical and provided with the sweeps, and the lever-arms pivoted to said shaft and provided at their outer ends with means whereby they may be engaged by a cart, substantially as set forth.

2. An apparatus substantially as described, comprising the shaft provided with the sweeps, and the lever-arms having the sliding sections provided with projections for engagement with an upright cleat on the cart, substantially as set forth.

3. The combination of the shaft inclined to the vertical and provided with the sweeps, the lever-arms pivoted to said shaft and provided with the section whereby they may be extended, and means whereby to lift said lever-arms at their outer ends, substantially as set forth.

4. In an apparatus substantially as described, the shaft having the lever-arms consisting of the inner sections and the outer sections sliding upon the inner sections together with a weight whereby to counterbalance the lever-arms when their extension-sections are adjusted inward, substantially as set forth.

5. In an apparatus substantially as described, the combination of the shaft inclined to the vertical and provided with the sweeps, the lever-arms pivoted at their inner ends to the shaft and the cam-rail upon which said arms rest, substantially as set forth.

6. In an apparatus substantially as described, the combination of the shaft inclined to the vertical and provided with the sweeps, the lever-arms pivoted to said shaft and provided with means whereby to limit their upward movements and means for lifting said arms at their outer ends, substantially as set forth.

7. The apparatus herein described comprising the shaft inclined to the vertical and provided with sweeps, the lever-arms pivoted to said shaft and composed of inner and outer sections slidably connected, means at the outer ends of the lever-arms whereby they may be engaged by a cart, means for lifting the said lever-arms, and means whereby to limit the upward movement of said arms, substantially as set forth.

8. The combination substantially as described of the shaft inclined to the vertical and provided with the sweeps, the lever-arms pivoted to said shaft, the cam-rail upon which said arms rest, the counterbalancing-weights connected with said arms and means for limiting the upward movement of the arms, substantially as set forth.

9. In an apparatus for transferring cane, the combination of the shaft, the sweeps thereon, the lever-arms arranged beneath the sweeps and pivoted at their inner ends whereby they may be raised and lowered at their outer ends, and devices for lifting said lever-arms at their outer ends, said devices being arranged for operation independently of the movement of the sweeps, substantially as set forth.

AUGUSTUS BARBAY.

Witnesses:
JOSEPH A. GRACE,
ALBERT T. GRACE.